Sept. 6, 1949.  H. K. DE LONG ET AL  2,481,204
MAGNESIUM PRIMARY CELL
Filed July 2, 1947
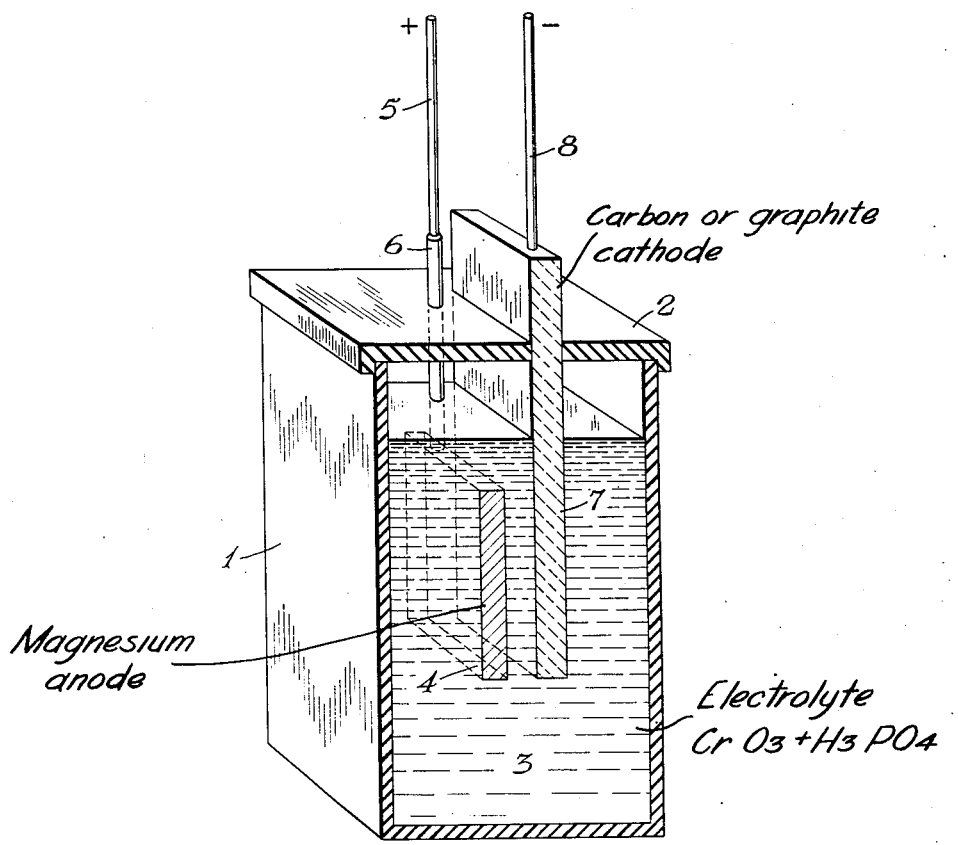
INVENTORS.
Herbert K. DeLong
Hugo A. Barbian
BY
Griswold & Burdick
ATTORNEYS Patented Sept. 6, 1949

2,481,204

UNITED STATES PATENT OFFICE 2,481,204

MAGNESIUM PRIMARY CELL

Herbert K. De Long and Hugo A. Barbian, Midland, Mich., assignors to The Dow Chemical Company, Midland, Mich., a corporation of Delaware Application July 2, 1947, Serial No. 758,518

4 Claims. (Cl. 136—100)

This invention relates to improvements in primary cells employing a magnesium anode, in which the electrolyte is an aqueous solution comprising chromic acid.

It has been heretofore disclosed that solutions of chromic acid may be employed as electrolyte for magnesium primary cells. With such an electrolyte, if free from deleterious impurities, the open circuit attack of the aqueous electrolyte on the magnesium anode is reduced to a low order. A disadvantage of such a primary cell, when the electrolyte is a solution of chromic acid alone, is that the initial closed circuit voltage is a low value of the magnitude of about 0.6 volt, varying little with concentrations of chromic acid up to about 50 per cent by weight.

As a means of increasing the initial closed circuit voltage of such a magnesium primary cell, it has been proposed to add a fluoride to the chromic acid electrolyte. In this way the initial voltage is said to be raised materially, e. g. to a value of over 1 volt. However, this initially high voltage falls rapidly when the cell is in use, and a serviceable voltage can be maintained for only a short period of operation.

The utility of primary cells for industrial uses depends not only on their voltage, but also on their useful life in service and on the efficiency of the electrochemical system employed to generate the current. The useful life of a cell is measured by its capacity, which term is used herein to mean the ampere-hours delivered upon discharge from the initial voltage to a prescribed minimum usable voltage, which is taken usually as 1.0 volt or 0.5 volt, depending on the type of service required for the cell. Capacity varies directly with the volume of electrolyte in a cell. Thus, capacity in a particular case is defined in terms of ampere-hours delivered on discharge of a cell of definite volume to a definite minimum voltage. The efficiency of a cell is determined by the ratio of the theoretical weight loss of the consumable anode to the actual weight loss of the same in generating current in ampere-hours equal to the capacity of the cell. In the case of magnesium, the electrochemical equivalent is approximately 1,000 ampere-hours per pound. Thus, in a primary cell having a magnesium anode, a weight loss of 1 pound of magnesium by dissolution is equivalent at 100 per cent efficiency to 1,000 ampere-hours of current.

In the magnesium primary cells of the prior art, those employing solutions of chromic acid alone as electrolyte have the disadvantages of low voltage and low capacity, but the efficiency is good. Those employing solutions of chromic acid containing a fluoride have relatively high initial voltage and moderate to good efficiency, but low capacity.

It is an object of this invention to provide a magnesium primary cell with a chromic acid electrolyte, which has a high initial voltage and greater capacity than those of the prior art, accompanied by good efficiency.

Our invention is based on the discovery that the addition of phosphoric acid to a chromic acid electrolyte in a magnesium primary cell increases the voltage of the same. Within the range of proportions hereinafter stated, the improved electrolyte in a magnesium primary cell gives a susbtantial increase in voltage over solutions of chromic acid alone, combined with high capacity and efficiency.

We have found that the rate of increase of voltage obtainable by addition of phosphoric acid to a chromic acid electrolyte depends upon the concentration of $CrO_3$ in the solution. In general, the higher the concentration of the chromic acid solution, the higher the ratio of $H_3PO_4/CrO_3$ required to produce an equal increase in voltage. On the other hand, in order to prevent the deposit of a polarizing film on a magnesium anode in a chromic acid electrolyte containing phosphoric acid, the concentration of $CrO_3$ should be 30 per cent by weight or more. The range of proportions, within which a substantial increase in voltage is obtained without producing a film on the surface of the magnesium anode, is from 30 to 50 per cent by weight of $CrO_3$ and 5 to 25 per cent by weight of $H_3PO_4$. Optimum results are obtained in the range of 40 to 45 per cent of $CrO_3$ and 20–25 per cent of $H_3PO_4$, when considering not only the increased voltage but also the capacity and efficiency of the cell. Within the broad percentage range above stated, the limit of solubility will be slightly exceeded, if the maximum stated amounts of the two solutes are employed together. A solution containing 45 per cent $CrO_3$ and 25 per cent $H_3PO_4$ is saturated, and for solutions containing more than 45 per cent and up to 50 per cent of $CrO_3$, the saturating amount of $H_3PO_4$ is less than 25 per cent by weight. In any case the two solutes are to be employed within the limit of solubility thereof.

In the following Table I are shown representative data that have been obtained in experimental cells having a volume of 500 cc. of electrolyte. In each case the anode was of a magnesium alloy and the cathode was of graphite, the dimensions of the anodes being 2" x 3½" x ¼"

The magnesium alloy was a commercial alloy identified as Dowmetal J-1, heat treated at 940° F. for 8 hours and quenched. This is a so-called high purity alloy having the composition: Al, 6.5 per cent; Mn, 0.2 per cent; Zn, 1.0 per cent; Fe, less than 0.002 per cent; Cu, less than 0.002 per cent; Ni, less than 0.001 per cent; balance, Mg. The tests were run at normal room temperature, at a current density of from 1 to 3 amperes per square foot. In the table the first two columns show the per cent by weight of the active components of the aqueous electrolyte; the third column shows the initial closed circuit voltage; the fourth and fifth columns show the ampere-hours delivered on discharge to 1.0 volt and 0.5 volt, respectively; and the last column shows the electrochemical efficiency measured by the loss in weight of the magnesium anode.

Table I

| | Per cent $CrO_3$ | Per cent $H_3PO_4$ | Volt | Amp.-Hrs. to 1.0 v. | Amp.-Hrs. to 0.5 v. | Eff., per cent |
|---|---|---|---|---|---|---|
| 1 | 10 | | .57 | | 5.3 | |
| 2 | 30 | | .58 | | 15.4 | 87 |
| 3 | 50 | | .59 | | 28.7 | 81 |
| 4 | 30 | 5 | .77 | | 21.9 | 83 |
| 5 | 30 | 10 | .97 | | 26.2 | 78 |
| 6 | 30 | 15 | 1.39 | 23.7 | 30.8 | 77 |
| 7 | 30 | 17.5 | 1.45 | 25.5 | 29.9 | 71 |
| 8 | 40 | 5 | .67 | | 28.0 | 88 |
| 9 | 40 | 10 | .95 | | 31.1 | 90 |
| 10 | 40 | 17 | 1.01 | 27.9 | 32.4 | 84 |
| 11 | 40 | 20 | 1.23 | 31.8 | 35.6 | 81 |
| 12 | 40 | 23 | 1.31 | 28.4 | 35.8 | 84 |
| 13 | 45 | 18 | .94 | | 30.6 | 88 |
| 14 | 45 | 20 | .95 | | 32.3 | 88 |
| 15 | 45 | 22.5 | 1.06 | 22.9 | 29.0 | 88 |
| 16 | 45 | 25 | 1.32 | 23.5 | 24.3 | 84 |
| 17 | 50 | 10 | .66 | | 29.7 | 81 |

The first three lines of the table show the results with an electrolyte of $CrO_3$ alone in the percentages stated. The succeeding groups of lines 4–7, 8–11, 12–15 and 16 show the effect of additions of $H_3PO_4$, progressively increasing voltage with increase of $H_3PO_4$ content. The greatest increase in initial voltage is shown in the solutions containing 30 per cent of $CrO_3$, but the lower voltages of the groups containing 40 and 45 per cent of $CrO_3$ show comparable or greater capacity and higher efficiency.

The purity of the electrolyte is of importance and for best performance, particularly efficiency, it should be free from anions other than $CrO_4^{--}$ and $PO_4^{---}$, with the exception that a very small concentration of $SO_4^{--}$ ions has certain advantages, if a tolerance limit of about 0.25 per cent of the $CrO_3$ content of the solution is not exceeded. Sulphate is a common impurity of the usual technical grades of chromic acid and phosphoric acid, which should be removed, at least to below the tolerance limit, when the technical acids are used for preparing the electrolyte. This may be done by treating the acid solution with barium carbonate to precipitate the sulphate as barium sulphate, boiling to decompose any excess carbonate, and filtering off the precipitate. Small additions of sulphuric acid or a soluble sulphate within the tolerance limit have the effect of further increasing the initial closed circuit voltage, although at the expense of lowering the capacity and efficiency of the cell. At the higher $CrO_3$ concentrations the negative effect of sulphate on capacity and efficiency is less pronounced than at lower $CrO_3$ concentrations. The higher voltage attainable by addition of sulphate increases the power of the cell at the beginning of discharge, but shortens its useful life. In cases where higher power at the start is of more importance than long life, the addition of sulphate to the electrolyte, within the tolerance limit, is indicated.

Table II shows the effect of sulphate upon the initial closed circuit voltage, capacity and efficiency of the cell, with electrolytes containing varying proportions of $CrO_3$ and $H_3PO_4$. The tests shown in Table II were made under the same condition as those in Table I, except for the addition of sulphate to the electrolyte.

Table II

| | Percent $CrO_3$ | Percent $H_3PO_4$ | Percent $SO_4^{--}$ | Volt | Amp.-Hrs. to 1 v. | Amp.-Hrs. to 0.5 v. | Eff., per cent |
|---|---|---|---|---|---|---|---|
| 1 | 30 | 10 | | .97 | | 26.2 | 78 |
| 2 | 30 | 10 | .01 | 1.22 | 23.8 | 26.7 | 71 |
| 3 | 30 | 10 | .05 | 1.67 | 14.2 | 15.2 | 40 |
| 4 | 30 | 15 | | 1.39 | 23.7 | 30.8 | 77 |
| 5 | 30 | 15 | .01 | 1.62 | 23.4 | 25.8 | 62 |
| 6 | 30 | 15 | .05 | 1.69 | 13.6 | 14.7 | 35 |
| 7 | 30 | 15 | .10 | 1.82 | 5.2 | 6.1 | 14 |
| 8 | 40 | 10 | | .95 | | 31.1 | 90 |
| 9 | 40 | 10 | .01 | .94 | | 30.5 | 85 |
| 10 | 40 | 10 | .05 | 1.62 | 24.5 | 27.2 | 67 |
| 11 | 40 | 10 | .10 | 1.79 | 17.3 | 19.2 | 45 |
| 12 | 40 | 15 | .01 | 1.18 | 25.3 | 30.5 | 80 |
| 13 | 40 | 15 | .05 | 1.73 | 23.7 | 27.1 | 63 |
| 14 | 40 | 15 | .10 | 1.89 | 15.8 | 16.9 | 37 |
| 15 | 45 | 15 | .05 | 1.67 | 24.0 | 30.8 | 71 |
| 16 | 45 | 15 | .10 | 1.79 | 24.0 | 25.2 | 54 |
| 17 | 45 | 20 | .05 | 1.76 | 26.1 | 26.7 | 65 |
| 18 | 45 | 20 | .10 | 1.87 | 22.6 | 25.2 | 51 |

A comparison of the results shown in Table II with those of Table I brings out the voltage increase with increase of sulphate in the electrolyte. With a sulphate content below the tolerance limit of 0.25 per cent of the weight of $CrO_3$ in the electrolyte, a materially higher initial voltage is produced with good capacity and a not excessive loss of efficiency, particularly at $CrO_3$ concentrations from about 40 to 45 per cent.

The performance tests shown in Tables I and II, as above indicated, were made with cells having a volume of 500 cc. of electrolyte. The capacity of a cell being proportional to its volume, larger sizes of cells have correspondingly larger capacity, although the increase in capacity is not exactly proportional to increase in size, due to the effect of operating for a longer time at less than theoretical efficiency. As a comparison, a 500 cc. cell with electrolyte containing 40 per cent $CrO_3$ and 23 per cent $H_3PO_4$, by weight, had a capacity of 28.4 ampere-hours on continuous discharge to 1.0 volt, while a 10,000 cc. cell with the same electrolyte and at the same current density produced 560 ampere-hours on continuous discharge to 1.0 volt, i. e. 98.6 per cent of the expected capacity as extrapolated from the capacity of the 500 cc. cell.

As anode for the primary cell either magnesium or the usual commercial magnesium alloys may be used, with no significant differences in cell performance. Suitable commercial alloys have the following composition:

| Alloy | Al | Mn | Zn | Mg |
|---|---|---|---|---|
| M | | 1.5 | | Balance. |
| FS-1 | 3.0 | 0.3 | 1.0 | Do. |
| J-1 | 6.5 | 0.2 | 1.0 | Do. |

The magnesium or magnesium alloy used for the purpose should conform to standard specifications for purity, particularly as to the heavy metals Fe, Cu, Ni. The anodes may be formed by casting or from wrought metal, such as plates of suitable thickness. In service the magnesium anodes are dissolved smoothly and uniformly on closed circuit in accordance with the electrochemical reaction, and are subject to very slight, if any, corrosion while standing on open circuit. On discharge, a current density up to about 6 amperes per square foot may be employed, with optimum performance at densities up to about 3 amperes per square foot.

For the cathode of the primary cell either graphite or hard carbon may be used, although graphite is preferred, with current densities of about the same order as for the anodes.

In the drawing, the single figure is a sectional view of a primary cell for use according to the invention. The container is a jar 1 made of an insulating material such as glass or molded plastic, having a cover 2 of similar material. Jar 1 is filled with a liquid electrolyte 3 of the type herein described to a level as shown. The anode 4 is a plate of magnesium or magnesium alloy, preferably submerged beneath the surface of the electrolyte, and provided with a lead-in rod or wire 5 secured thereto, the latter being covered or coated with a layer of insulating material 6 in the parts exposed to contact with the electrolyte. The cathode 7 is a plate of graphite or carbon, disposed parallel to anode 4. Cathode 7 may extend upwardly through a slot in the cover, as shown, and is provided with a lead-in wire 8 secured thereto in any usual manner.

We claim:

1. A primary cell comprising an anode consisting essentially of magnesium and an electrolyte consisting essentially of an aqueous solution of chromic acid and phosphoric acid, in which the content of $CrO_3$ is from 30 to 50 per cent by weight and the content of $H_3PO_4$ is from 5 to 25 per cent by weight, but within the limit of solubility of the two solutes.

2. A primary cell as claimed in claim 1, in which the electrolyte contains sulphate expressed as $SO_4^{--}$ ion in amount by weight not exceeding 0.25 per cent of the weight of $CrO_3$ therein.

3. A primary cell comprising an anode consisting essentially of magnesium and an electrolyte consisting essentially of an aqueous solution of chromic acid and phosphoric acid, in which the content of $CrO_3$ is from 40 to 45 per cent by weight and the content of $H_3PO_4$ is from 20 to 25 per cent by weight.

4. A primary cell as claimed in claim 3, in which the electrolyte contains sulphate expressed as $SO_4^{--}$ ion in amount by weight not exceeding 0.25 per cent of the weight of $CrO_3$ therein.

HERBERT K. DE LONG.
HUGO A. BARBIAN.

REFERENCES CITED

The following references are of record in the file of this patent:

UNITED STATES PATENTS

| Number | Name | Date |
|---|---|---|
| 1,748,485 | Kugel | Feb. 25, 1930 |

Certificate of Correction

Patent No. 2,481,204 September 6, 1949

HERBERT K. DE LONG ET AL.

It is hereby certified that error appears in the printed specification of the above numbered patent requiring correction as follows:

Column 4, line 6, for "$PO^{---}$" read $PO_4^{---}$;

and that the said Letters Patent should be read with this correction therein that the same may conform to the record of the case in the Patent Office.

Signed and sealed this 21st day of February, A. D. 1950.

[SEAL]

THOMAS F. MURPHY,
*Assistant Commissioner of Patents.*